US010161565B2

(12) United States Patent
Wu (10) Patent No.: US 10,161,565 B2
(45) Date of Patent: Dec. 25, 2018

(54) SUSPENSION MOUNT (71) Applicant: Wistron NeWeb Corp., Hsinchu (TW)

(72) Inventor: Yu-Shuo Wu, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 59 days.

(21) Appl. No.: 15/651,322

(22) Filed: Jul. 17, 2017

(65) Prior Publication Data

US 2018/0031178 A1 Feb. 1, 2018

Related U.S. Application Data (60) Provisional application No. 62/366,806, filed on Jul. 26, 2016.

(51) Int. Cl.
B42F 13/00 (2006.01)
F16M 13/02 (2006.01)
F16F 1/12 (2006.01)
F16F 1/14 (2006.01)

(52) U.S. Cl.
CPC ............ F16M 13/027 (2013.01); F16F 1/12 (2013.01); F16F 1/14 (2013.01)

(58) Field of Classification Search
USPC ........................................................ 248/343
See application file for complete search history.

(56) References Cited

U.S. PATENT DOCUMENTS

| 8,453,988 | B2 * | 6/2013 | Simpson | E04B 9/006 248/228.3 |
| 9,955,597 | B1 * | 4/2018 | Wu | F16M 13/027 |
| 2010/0302127 | A1 * | 12/2010 | Frank | H01Q 1/007 343/892 |
| 2014/0021315 | A1 * | 1/2014 | Johnson | A47F 5/0006 248/276.1 |
| 2014/0117186 | A1 * | 5/2014 | Govindasamy | F16M 11/16 248/317 |
| 2015/0181645 | A1 * | 6/2015 | Anderson | H01Q 1/22 361/814 |
| 2015/0264823 | A1 * | 9/2015 | Shirley | F16M 13/02 248/287.1 |

* cited by examiner

Primary Examiner — Monica E Millner
(74) Attorney, Agent, or Firm — McClure, Qualey & Rodack, LLP (57) ABSTRACT A suspension mount is provided, which is capable of selectively hanging an electronic device onto different ceiling structures. The suspension mount includes a first member, a pivot shaft and a second member. The first member includes a first restriction unit and a second restriction unit. The second member pivots on the first member by the pivot shaft. The second member includes a third restriction unit and a fourth restriction unit. The first restriction unit corresponds to the third restriction unit. The second restriction unit corresponds to the fourth restriction unit. When the suspension mount is connected to the first ceiling structure, the first restriction unit and the fourth restriction unit abut a side of the first ceiling structure, and the second restriction unit and the third restriction unit abut the other side of the first ceiling structure.

20 Claims, 8 Drawing Sheets

SUSPENSION MOUNT

CROSS REFERENCE TO RELATED APPLICATIONS

This application claims the benefit of U.S. Provisional Application No. 62/366,806, filed on Jul. 26, 2016, the entirety of which is incorporated by reference herein.

BACKGROUND OF THE INVENTION

Field of the Invention

The present invention relates to a suspension mount, and in particular to a suspension mount adapted to be selectively hung on ceiling structures of different designs.

Description of the Related Art

Wireless routers and other electronic devices are hung on ceilings using suspension mounts. Conventionally, a suspension mount connects the metal supporters of the ceilings. The metal supporters can be T-shaped beams or the other design. However, since there are many different kinds of metal supporters, one single conventional suspension mount cannot be adapted to be connected to variety of metal supporters. Therefore, the electronic devices (for example, wireless router) encounter problems during installation.

BRIEF SUMMARY OF THE INVENTION

In one embodiment of the present invention, a suspension mount is provided. The suspension mount is capable of selectively hanging an electronic device onto at least first ceiling structure, second ceiling structure or third ceiling structure. Each of the first ceiling structure, the second ceiling structure and the third ceiling structure is longitudinal and has a central rib. The width of the first ceiling structure is different from the width of the second ceiling structure. The first ceiling structure and the second ceiling structure are lower than the ceiling tiles thereby being capable of having the ceiling tiles to be placed thereon. The third ceiling structure is received in a recess between the ceiling tiles. The suspension mount comprises a first member, a pivot shaft and a second member. The first member comprises a first restriction unit and a second restriction unit. The second member pivots relative to the first member about the pivot shaft. The second member comprises a third restriction unit and a fourth restriction unit. The first restriction unit and the second restriction unit extend in a direction perpendicular to the first member. The third restriction unit and the fourth restriction unit extend in a direction perpendicular to the second member. The first restriction unit corresponds to the third restriction unit. The second restriction unit corresponds to the fourth restriction unit. The first restriction unit is rotationally symmetrical to the second restriction unit. The third restriction unit is rotationally symmetrical to the fourth restriction unit. When the suspension mount is connected to the first ceiling structure, the first restriction unit and the fourth restriction unit abut a side of the first ceiling structure, and the second restriction unit and the third restriction unit abut the other side of the first ceiling structure.

According to another embodiment of the present invention, a suspension mount is provided and capable of selectively hanging an electronic device onto at least first ceiling structure, second ceiling structure or third ceiling structure. Each of the first ceiling structure, the second ceiling structure and the third ceiling structure is longitudinal and has a central rib. The width of the first ceiling structure is different from the width of the second ceiling structure. The first ceiling structure and the second ceiling structure are lower than the ceiling tiles thereby being capable of having the ceiling tiles to be placed thereon. The third ceiling structure is received in a recess between the ceiling tiles. The suspension mount comprises: a first member, a pivot shaft, and a second member. The first member comprises a first restriction unit and a second restriction unit, and the second member pivots relative to the first member about the pivot shaft, the second member comprises a third restriction unit and a fourth restriction unit. The first restriction unit and the second restriction unit protrude from the first member in a direction parallel to the pivot shaft, the third restriction unit and the fourth restriction unit protrude in such direction as well. The first restriction unit corresponds to the third restriction unit, and the second restriction unit corresponds to the fourth restriction unit. When the suspension mount is connected to the first ceiling structure, the first restriction unit and the fourth restriction unit abut one side of the first ceiling structure, and the second restriction unit and the third restriction unit abut the other side of the first ceiling structure. The first member and the second member compose an X-shaped structure.

According to another embodiment of the present invention, a suspension mount is provided and capable of selectively hanging an electronic device onto at least first ceiling structure, second ceiling structure or third ceiling structure. Each of the first ceiling structure, the second ceiling structure, and the third ceiling structure is longitudinal and has a central rib. The width of the first ceiling structure is different from the width of the second ceiling structure. The first ceiling structure and the second ceiling structure are lower than the ceiling tiles, thereby being capable of having the ceiling tiles to be placed thereon. The third ceiling structure is received in a recess between the ceiling tiles. The suspension mount comprises: a first member, a pivot shaft, and a second member. The first member has a first restriction unit and a second restriction unit extended from the first member and toward a direction. The second member is relative to the first member about the pivot shaft and has a third restriction unit and a fourth restriction unit extended from the second member and toward the direction. The first restriction unit corresponds to the third restriction unit, and the second restriction unit corresponds to the fourth restriction unit. The first restriction unit is rotationally symmetrical to the second restriction unit, and the third restriction unit is rotationally symmetrical to the fourth restriction unit. The first restriction unit comprises a first holding portion and a first hook portion extending in the direction, and the extended distances from the of the first holding portion and the first hook portion are different.

By utilizing the suspension mount of the present invention, the first member and the second member clips the ceiling structure with the either holding portions, the hooking portions, or the abutting portions of the restriction units, thereby affixing the suspension mount B to ceiling structures of various sizes or types.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
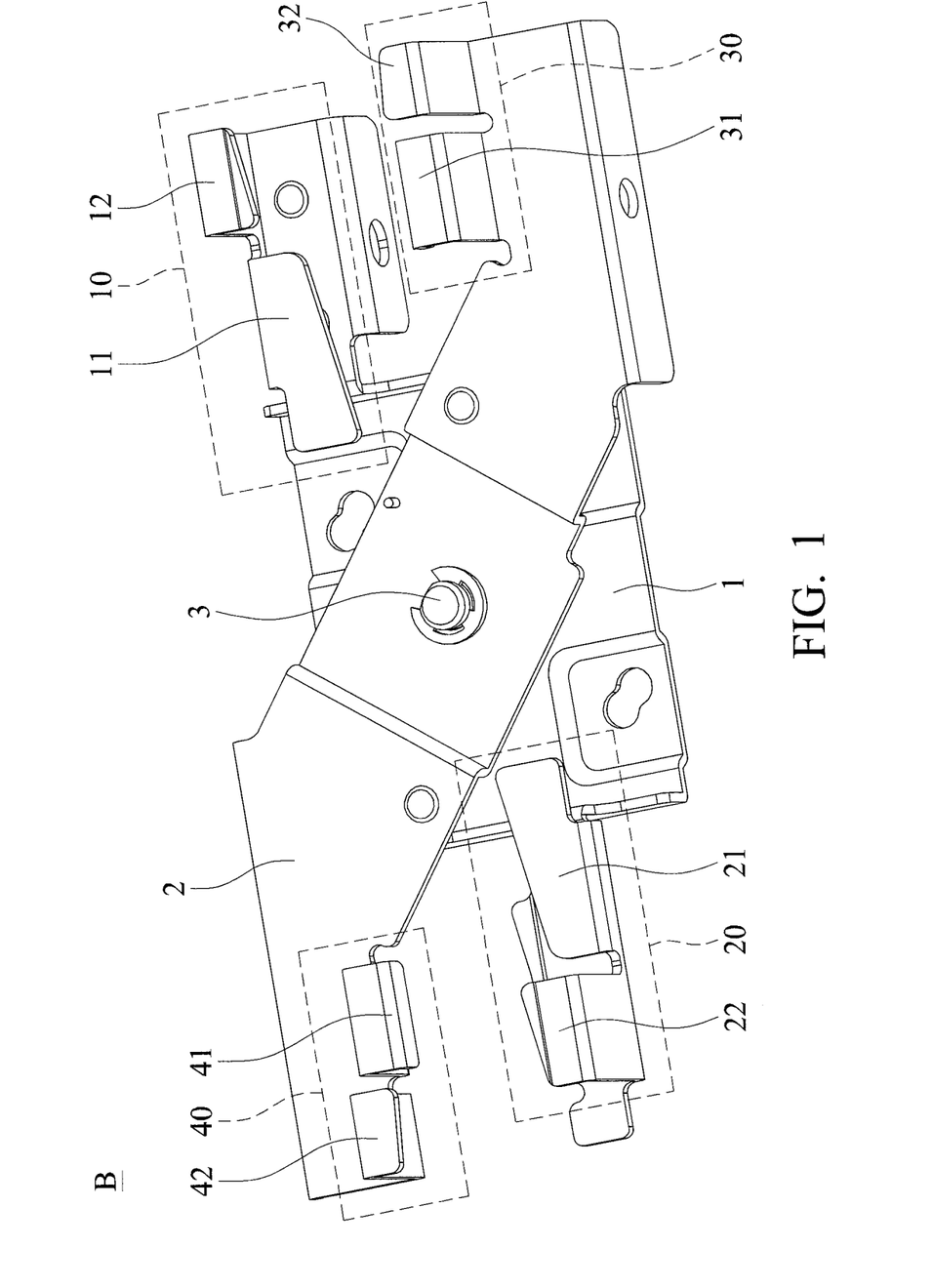
FIG. 1 shows a suspension mount of an embodiment of the invention.
Figure 2A:
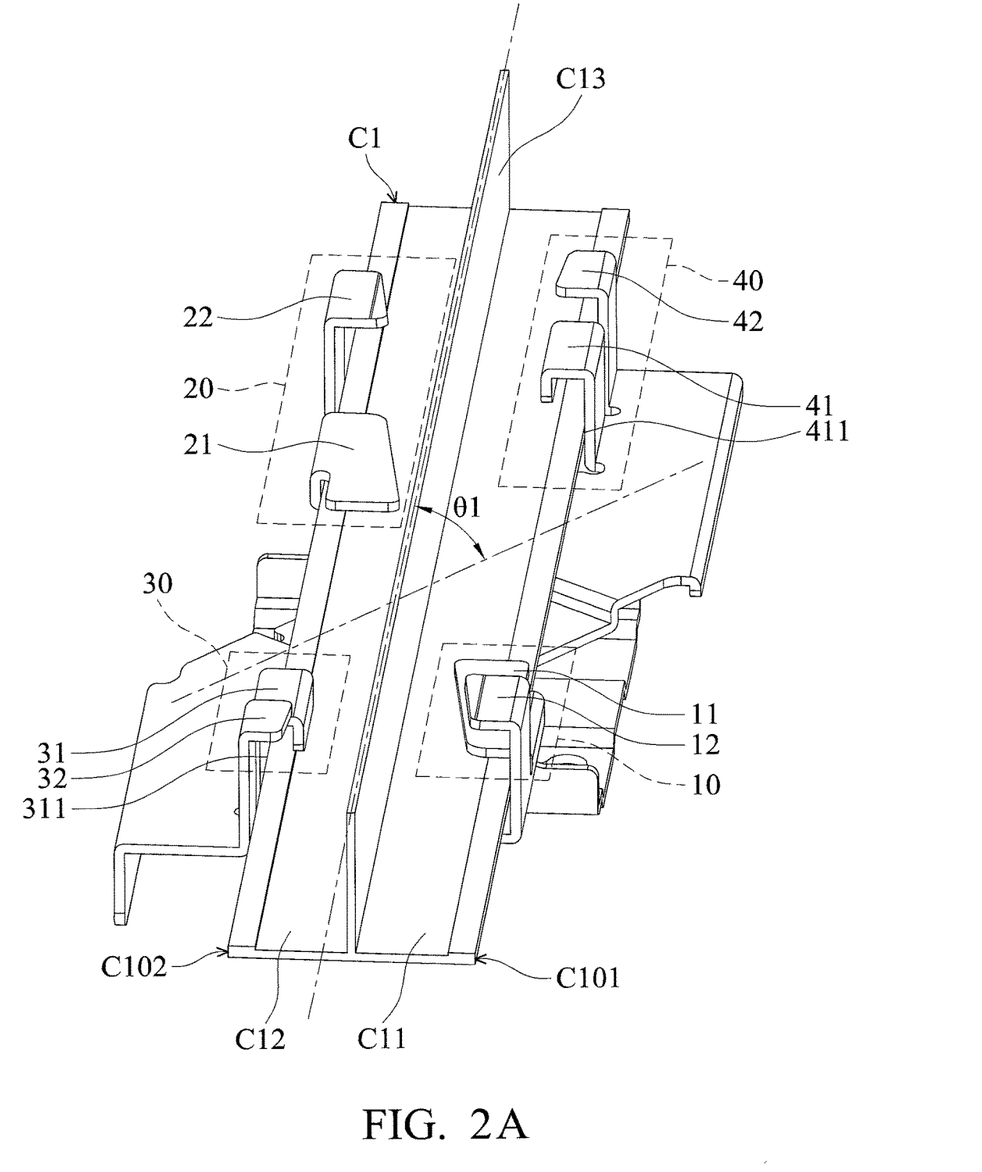
FIG. 2A shows the suspension mount of the embodiment of the invention, wherein the suspension mount is connected to a first ceiling structure.

FIG. 1 shows a suspension mount B of an embodiment of the invention. The suspension mount B is capable of selectively hanging an electronic device (not shown) onto various ceiling structures, or so-called T-bars, in the following embodiments, three ceiling structures, i.e. first ceiling structure, second ceiling structure and third ceiling structure, are depicted as exemplary purposes, the types of ceiling structures applicable to the present invention should not be limited to those disclosed herein. The first ceiling structure, the second ceiling structure and the third ceiling structure are longitudinal structures with a central rib. The width of the first ceiling structure differs from the width of the second ceiling structure. The first ceiling structure and the second ceiling structure are lower than the ceiling tiles so that the ceiling tiles can be properly placed on either the first ceiling structure or the second ceiling structure. More specifically, each of the first ceiling structure and the second ceiling structure has a flange part where the central rib extends from the middle part of the flange part along the longitudinal direction of the flange part, the previously mentioned being "lower than the ceiling tiles" means that at least a portion of the first or second ceiling structures are lower than the ceiling flanges. In this embodiment, the flange part is the portion located lower than the ceiling tiles, whereas the central rib is not located lower than the ceiling tiles. The third ceiling structure is received in a recess between the ceiling tiles. The suspension mount B comprises a first member 1, a pivot shaft 3 and a second member 2. The first member 1 comprises a first restriction unit 10 and a second restriction unit 20. The second member 2 pivots on the first member 1 by the pivot shaft 3. The second member 2 comprises a third restriction unit 30 and a fourth restriction unit 40. The first restriction unit 10 and the second restriction unit 20 protrude vertically from, namely extend in a direction perpendicular to, the first member 1. The third restriction unit 30 and the fourth restriction unit 40 protrude vertically from, namely extend in a direction perpendicular to, the second member 2. The first restriction unit 10 corresponds to the third restriction unit 30. The second restriction unit 20 corresponds to the fourth restriction unit 40. The first restriction unit 10 is rotationally symmetrical to the second restriction unit 20. The third restriction unit 30 is rotationally symmetrical to the fourth restriction unit 40. With reference to FIG. 2A, the first ceiling structure C1 has a side C101 and a side C102. When the suspension mount B is connected to the first ceiling structure C1, the first restriction unit 10 and the fourth restriction unit 40 abut the side C101 of the first ceiling structure, and the second restriction unit 20 and the third restriction unit 30 abut the side C102 of the first ceiling structure. In one embodiment of the invention, at least the first restriction unit 10 and the second restriction unit 20 hook (for example, holding or hooking) the first ceiling structure. The third restriction unit 30 and the fourth restriction unit 40 abut the first ceiling structure. In another embodiment, the first restriction unit 10, the second restriction unit 20, the third restriction unit 30 and the fourth restriction unit 40 also can hook (for example, holding or hooking) the first ceiling structure simultaneously.

Figure 2B:
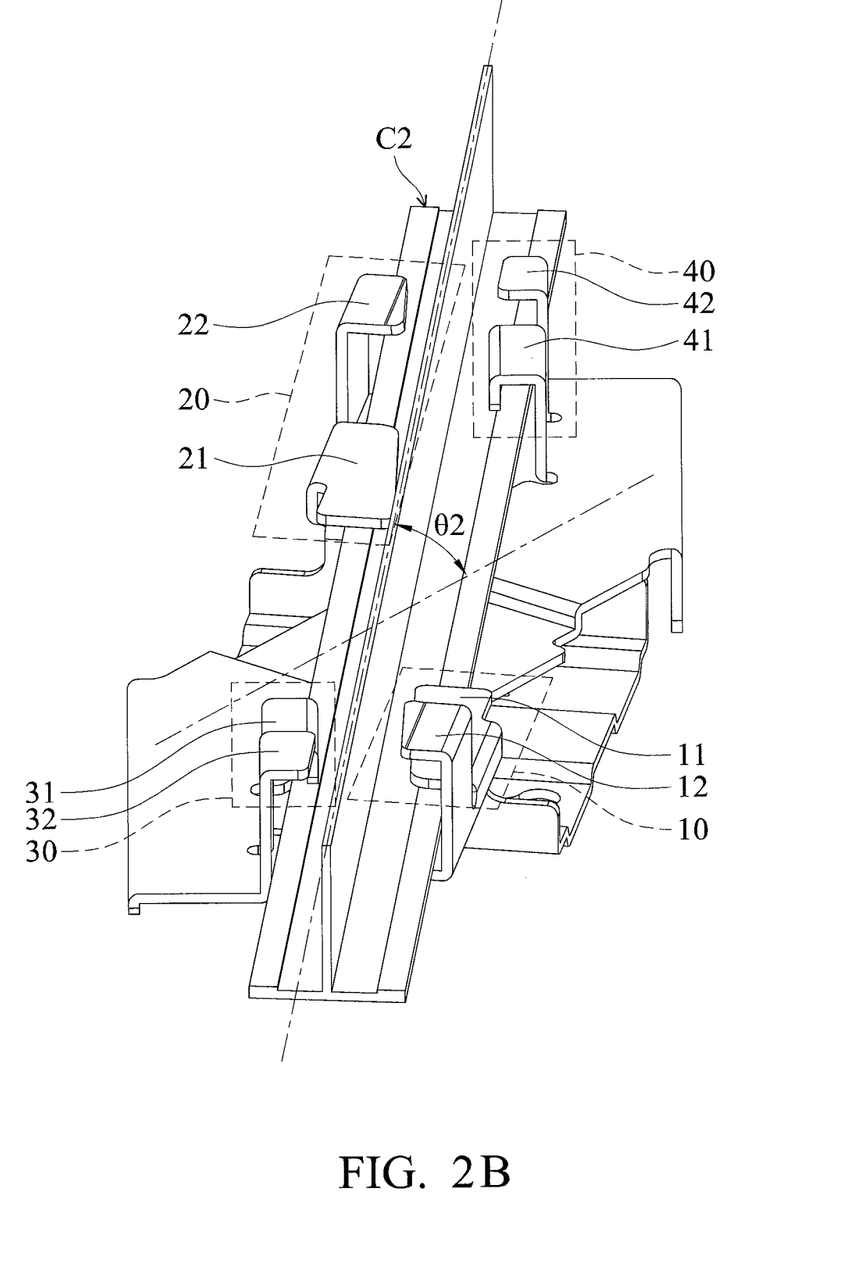
FIG. 2B shows the suspension mount of the embodiment of the invention, wherein the suspension mount is connected to a second ceiling structure.

In this embodiment, the first member 1 and the second member 2 compose an X-shaped structure, which hold the ceiling structure. With reference to FIGS. 2A and 2B, in one embodiment, the suspension mount B selectively hangs the electronic device (not shown) onto the first ceiling structure C1 and the second ceiling structure C2. In this embodiment, the width of the second ceiling structure C2 is smaller than the width of the first ceiling structure C1. When the suspension mount B is connected to the first ceiling structure C1, a first included angle θ1 is formed between the first member 1 and the second member 2. When the suspension mount B is connected to the second ceiling structure C2, a second included angle θ2 is formed between the first member 1 and the second member 2, and the first included angle θ1 differs from the second included angle θ2. In this embodiment, the second included angle θ2 is smaller than the first included angle θ1. Utilizing this embodiment, the first ceiling structure C1 and the second ceiling structure C2 are T-bar ceiling structures. According to the difference between the first ceiling structure C1 and the second ceiling structure C2, the first ceiling structure C1 and the second ceiling structure C2 abut the different portions of the third restriction unit 30 and the fourth restriction unit 40. The disclosure is not meant to restrict the invention.

Figure 3:
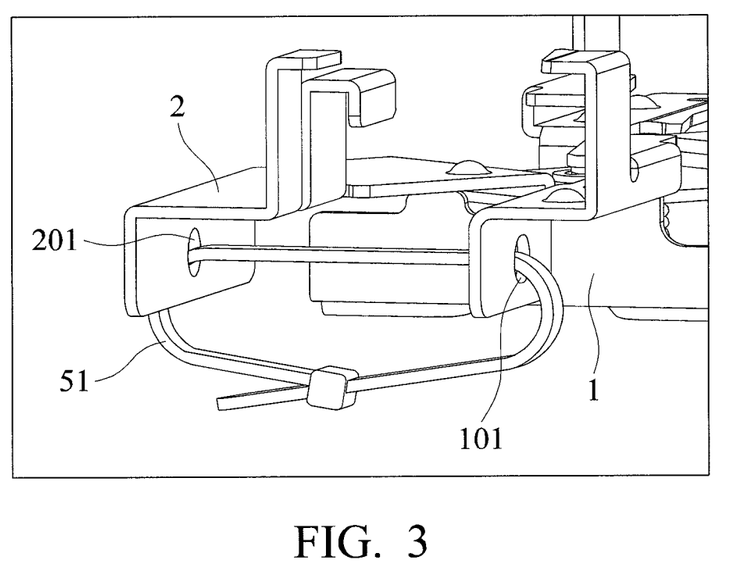
FIG. 3 shows the suspension mount of the embodiment of the invention, which further includes a restriction belt.

With reference to FIG. 3, in one embodiment, the suspension mount B further comprises a restriction belt (fastener) 51. The first member 1 comprises a first fastening hole 101. The second member 2 comprises a second fastening hole 201. The first fastening hole 101 and the second fastening hole 201 are located on the same side of the suspension mount B relative to the pivot shaft 3. When the suspension mount B is connected to, engages, the ceiling structure, the restriction belt (fastener) 51 passes through the first fastening hole 101 and the second fastening hole 201 to restrict the position of first member 1 relative to the second member 2. Therefore, the suspension mount B can firmly hold the ceiling structure.

Figure 4:
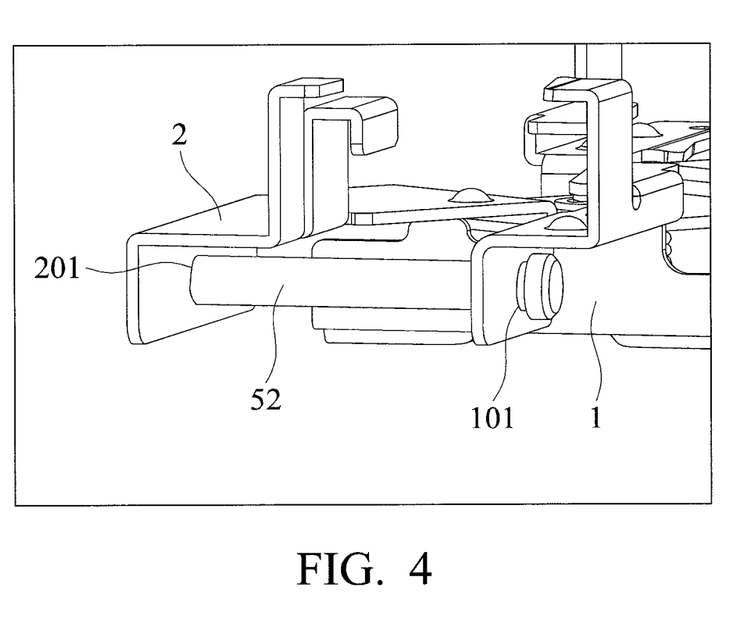
FIG. 4 shows the suspension mount of the embodiment of the invention, which further includes a positioning post.

With reference to FIG. 4, in another embodiment, the suspension mount B further comprises a positioning post (fastener) 52. The first member 1 comprises a first fastening hole 101. The second member 2 comprises a second fastening hole 201. The first fastening hole 101 and the second fastening hole 201 are located on the same side of the suspension B relative to the pivot shaft 3. When the suspension mount B is connected to the ceiling structure, the positioning post (fastener) 52 passes through the first fastening hole 101 and the second fastening hole 201 to restrict the position of first member 1 relative to the second member 2. Therefore, the suspension mount B can firmly hold the ceiling structure.

Figure 5A:
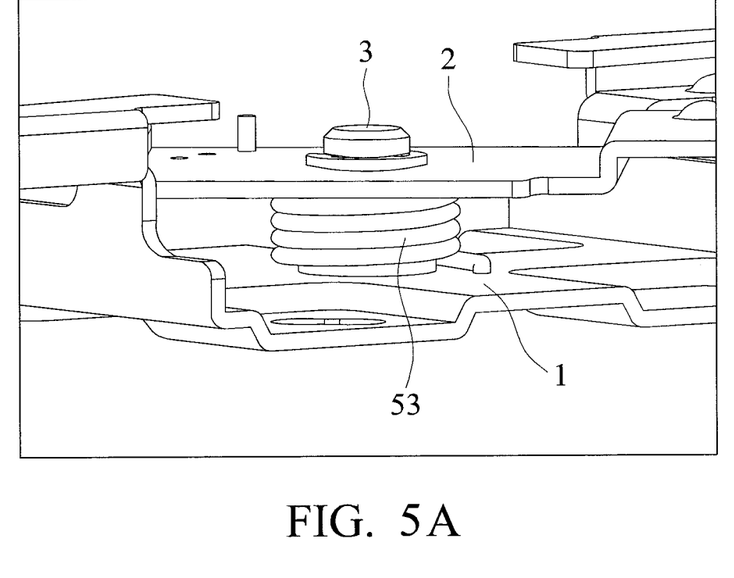
FIG. 5A shows the suspension mount of the embodiment of the invention, which further includes a torsion spring.

With reference to FIG. 5A, in one embodiment, an elastic recovery force is applied between the first member 1 and the second member 2 to make the first restriction unit 10 and the third restriction unit 30 close together, and make the second restriction unit 20 and the fourth restriction unit 40 close together. In an embodiment, the elastic recovery force can be generated by a torsion spring 53. The torsion spring 53 is wrapped around the pivot shaft 3. An end of the torsion spring 53 abuts the first member 1, and the other end of the torsion spring 53 abuts the second member 2. Therefore, while the torsion spring 53 provides the elastic recovery force to the suspension mount B, the suspension mount B clamps and thereby firmly hanging on the ceiling structure.

Figure 5B:
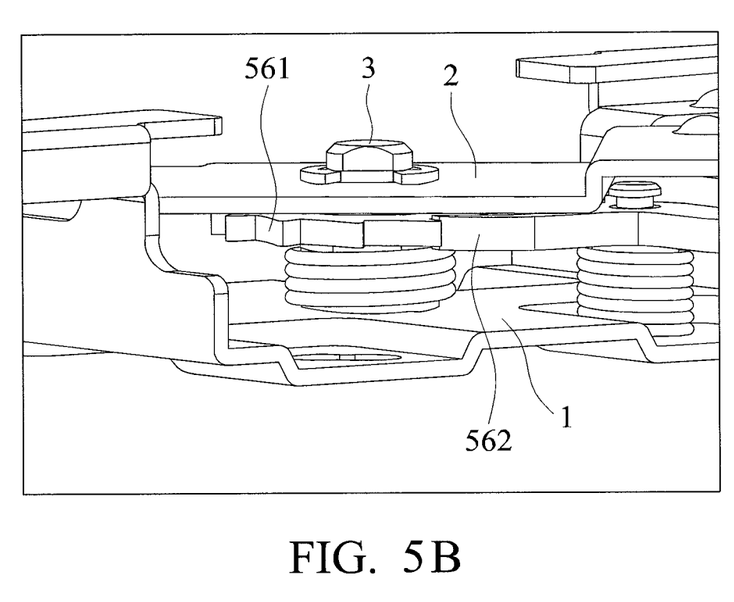
FIG. 5B shows the suspension mount of the embodiment of the invention, which further includes a ratchet wheel and an elastic pawl.

With reference to FIG. 5B, in one embodiment, the suspension mount B comprises a ratchet wheel 561 and an elastic pawl 562. The ratchet wheel 561 is disposed on the pivot shaft 3 and moves when the second member 2 moves. The elastic pawl 562 is disposed on the first member 1 and is adapted to engage the ratchet wheel 561. When the suspension mount B engages the ceiling structure, the elastic pawl 562 prevents the ratchet wheel 561 to rotate in a loosening direction, thereby preventing the ceiling structure to be released from the suspension mount B.

Figure 6A:
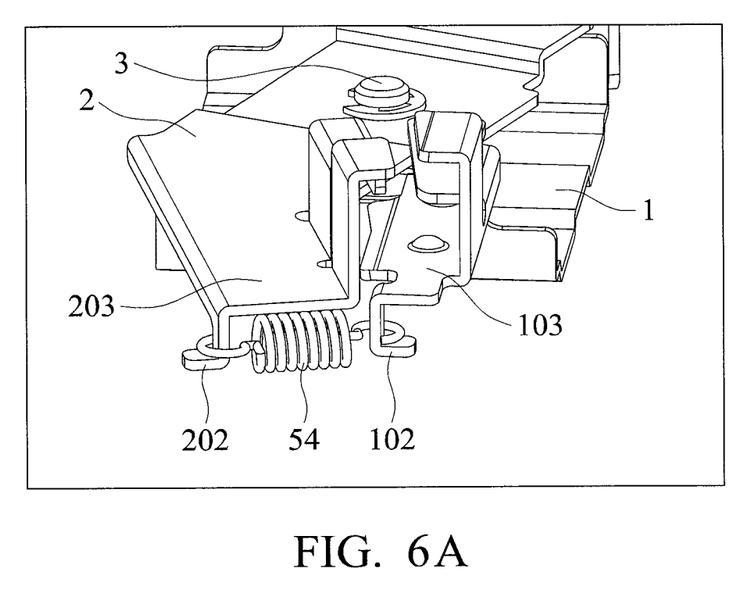
FIG. 6A shows the suspension mount of the embodiment of the invention, which further includes a tension spring.

With reference to FIG. 6A, in one embodiment, the suspension mount B comprises a straight spring 54. The first member 1 comprises a first attachment portion 102. The second member 2 comprises a second attachment portion 202. The first attachment portion 102 is disposed on a first end 103 of the first member 1. The second attachment portion 202 is disposed on a second end 203 of the second member 2. The first attachment portion 102 and the second attachment portion 202 are located on the same side of the suspension mount B relative to the pivot shaft 3. One end of the straight spring 54 is connected to the first attachment portion 102, and the other end of the straight spring 54 is connected to the second attachment portion 202. In this embodiment, the straight spring 54 is a tension spring. When the first end 102 is separated from the second end 203, the first attachment portion 102 is separated from the second attachment portion 202. The straight spring 54 provides the elastic recovery force to the suspension mount B, so that the suspension mount B can firmly clamp and hang on the ceiling structure.

Figure 6B:
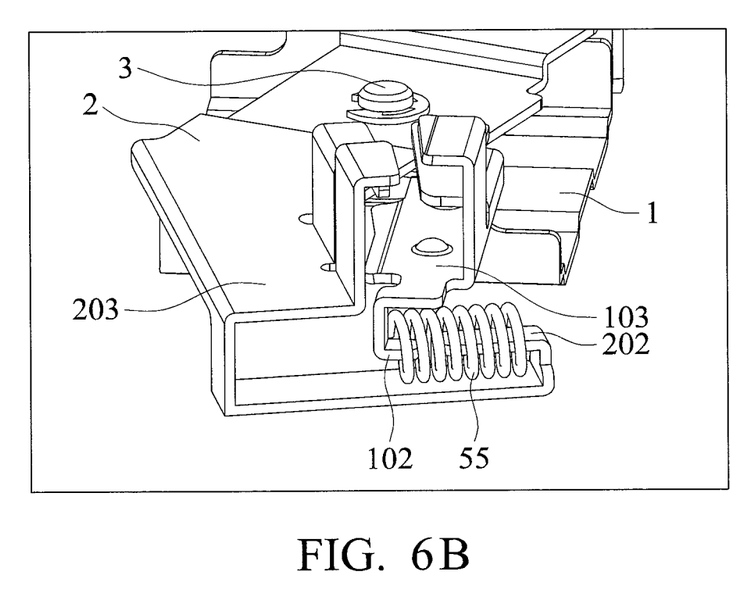
FIG. 6B shows the suspension mount of the embodiment of the invention, which further includes a compression spring.

With reference to FIG. 6B, in another embodiment, the straight spring 55 is a compression spring. When the first end 103 is separated from the second end 203, the first attachment portion 102 is close to the second attachment portion 202. The straight spring 55 provides the elastic recovery force for the suspension mount B, and the suspension mount B thus firmly hangs on the ceiling structure.

With reference to FIGS. 1 and 2A, in one embodiment, the first restriction unit 10 comprises a first holding portion 11, the second restriction unit 20 comprises a second holding portion 21, the third restriction unit 30 comprises a first abutting portion 31, and the fourth restriction unit 40 comprises a second abutting portion 41. The first ceiling structure C1 comprises a flange C11, a flange C12 and the central rib C13. When the suspension mount B is connected to the first ceiling structure C1, the first holding portion 11 pushes and holds a flange C11 of the first ceiling structure, the second holding portion 21 pushes and holds the other flange C12 of the first ceiling structure, the first abutting portion 31 abuts the other flange C12 of the first ceiling structure, and the second abutting portion 41 abuts the flange C11 of the first ceiling structure. The first holding portion 11 and the second holding portion 21 are L-shaped structure. In this embodiment, the first abutting portion 31 and the second abutting portion 41 both have a plurality of abutting surfaces. With reference to FIG. 2A, in this embodiment, the first abutting portion 31 abuts the other flange C12 with a lower abutting surface 311, and the second abutting portion 41 abuts the flange C11 with a lower abutting surface 411.

Figure 7:
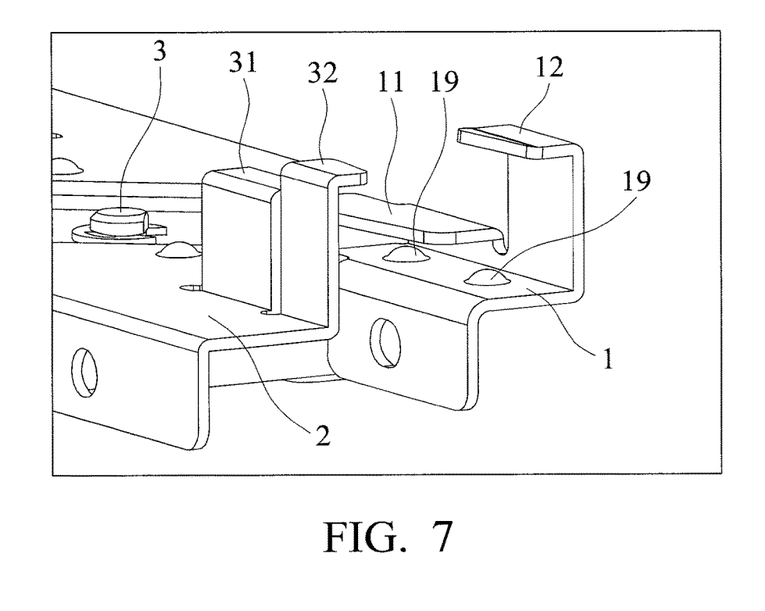
FIG. 7 shows protrusions of the suspension mount of the embodiment of the invention.

With reference to FIG. 7, in one embodiment, the first restriction unit 10 comprises a first protrusion 19, and the second restriction unit 20 comprises a second protrusion (not shown). The first protrusion 19 corresponds to the first holding portion 11 and is adapted to abut a bottom of the first ceiling structure C1. Similarly, the second protrusion corresponds to the second holding portion and is adapted to abut the bottom of the first ceiling structure C1. Therefore, the suspension mount B can firmly hold the ceiling structure.

Figure 8:
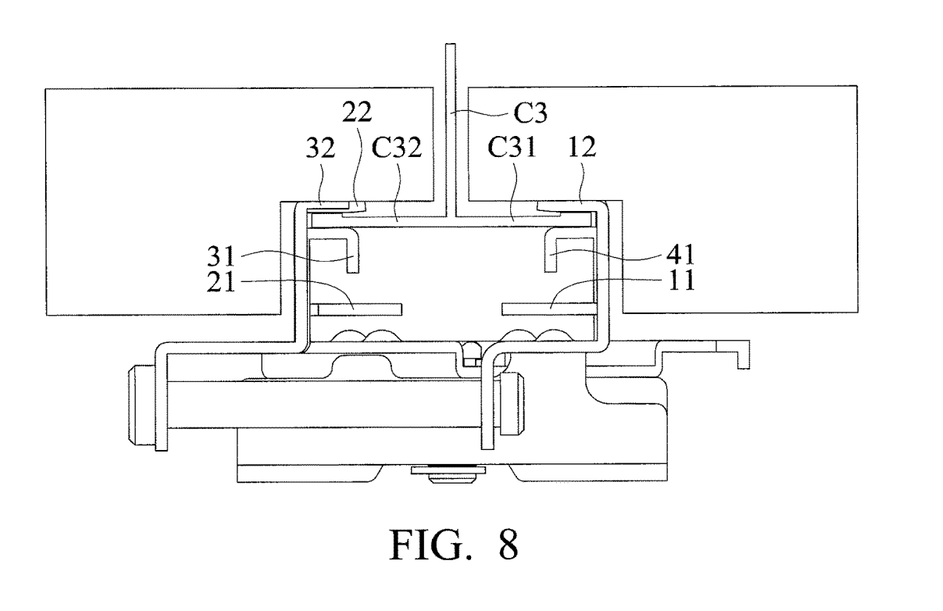
FIG. 8 shows the suspension mount of the embodiment of the invention, wherein the suspension mount is connected to a third ceiling structure.

With reference to FIGS. 1 and 8, in one embodiment, the suspension mount B is adapted to selectively hang on the third ceiling structure C3. The third ceiling structure C3 comprises a flange C31 and a flange C32. The first restriction unit 10 comprises a first hook portion 12, the second restriction unit 20 comprises a second hook portion 22, the third restriction unit 30 comprises a third hook portion 32, and the fourth restriction unit 40 comprises a fourth hook portion 42. When the suspension mount B is connected to the third ceiling structure C3, the first hook portion 12 and the fourth hook portion 42 hook a flange 31 of the third ceiling structure, and the second hook portion 22 and the third hook portion 32 hook the other flange C32 of the third ceiling structure. In one embodiment, the third ceiling structure C3 is a recessed ceiling track, or T-bar. The third ceiling structure C3 can also be other ceiling structure, such as Armstrong interlude ceiling structure. The first hook portion 12, the second hook portion 22, the third hook portion 32 and the fourth hook portion 42 are L-shaped. The height of the first hook portion 12, the second hook portion 22, the third hook portion 32 and the fourth hook portion 42 is higher than the height of the first holding portion 11 and the second holding portion 21. Particularly, an extending distance of the first holding portion 11 from the first member 1 in a vertical direction differs from an extending distance of the first hook portion 12 from the first member 1 in the vertical direction, and an extending distance of the first abutting portion 31 from the second member 2 in the vertical direction differs from an extending distance of the third hook portion 32 from the second member 2 in the vertical direction.

In the embodiments above, the included angle between the first member 1 and the second member 2 can be modified to connect the recesses ceiling tracks of different sizes.

With reference to FIG. 8, in one embodiment, when the suspension mount B is connected to the third ceiling structure C3, the third ceiling structure C3 is above the first holding portion 11 and the second holding portion 21.

Figure 9:
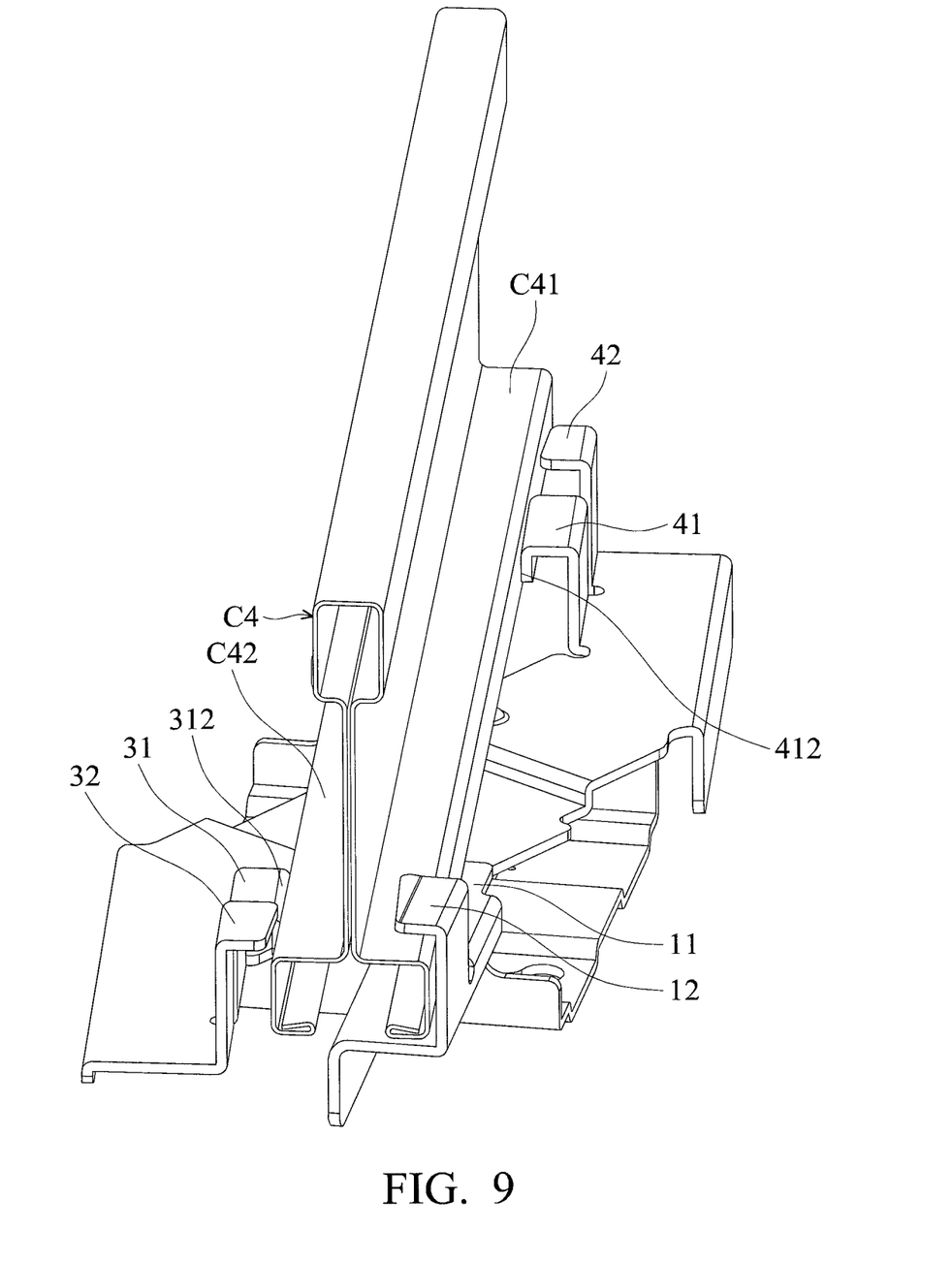
FIG. 9 shows the suspension mount of the embodiment of the invention, wherein the suspension mount is connected to a fourth ceiling structure.

With reference to FIGS. 1 and 9, in one embodiment, the suspension mount B is adapted to selectively hang the electronic device on a fourth ceiling structure C4. When the suspension mount B is connected to the fourth ceiling structure C4, the first hook portion 12 hooks a flange C41 of the fourth ceiling structure, the second abutting portion 41 abuts the flange C41 of the fourth ceiling structure, the second hook portion 22 hooks the other flange C42 (not shown) of the fourth ceiling structure, and the first abutting portion 31 abuts the other flange C42 of the fourth ceiling structure. In this embodiment, the first abutting portion 31 abuts the other flange C42 with an upper abutting surface 312, and the second abutting portion 41 abuts the flange C41 with an upper abutting surface 412.

In one embodiment, the fourth ceiling structure C4 can be Armstrong interlude ceiling structure, or other type ceiling structures.

Utilizing the suspension mount B of the embodiment of the invention, the first member and the second member clips the ceiling structure with the holding portions, the hooking portions or the abutting portions of the restriction units. Therefore, the suspension mount B can be affixed to ceiling structures of different sizes or shapes.

Use of ordinal terms such as "first", "second", "third", etc., in the claims to modify a claim element does not by itself connote any priority, precedence, or order of one claim element over the other or the temporal order in which acts of a method are performed, but are used merely as labels to distinguish one claim element having a certain name from the other element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A suspension mount, capable of selectively hanging an electronic device onto at least first ceiling structure, second ceiling structure or third ceiling structure, each of the first ceiling structure, the second ceiling structure and the third ceiling structure being longitudinal and having a central rib, the width of the first ceiling structure being different from the width of the second ceiling structure, the first ceiling structure and the second ceiling structure being lower than the ceiling tiles thereby being capable of having the ceiling tiles to be placed thereon, the third ceiling structure received in a recess between the ceiling tiles, and the suspension mount comprising:
   a first member, comprising a first restriction unit and a second restriction unit;
   a pivot shaft; and
   a second member, wherein the second member pivots relative to the first member about the pivot shaft, the second member comprises a third restriction unit and a fourth restriction unit, the first restriction unit and the second restriction unit extend in a direction perpendicular to the first member, the third restriction unit and the fourth restriction unit extend in a direction perpendicular to the second member, the first restriction unit corresponds to the third restriction unit, the second restriction unit corresponds to the fourth restriction unit, the first restriction unit is rotationally symmetrical to the second restriction unit, and the third restriction unit is rotationally symmetrical to the fourth restriction unit, wherein when the suspension mount is connected to the first ceiling structure, the first restriction unit and the fourth restriction unit abut a side of the first ceiling structure, and the second restriction unit and the third restriction unit abut the other side of the first ceiling structure.

2. The suspension mount as claimed in claim 1, wherein the first member and the second member from an X-shaped structure.

3. The suspension mount as claimed in claim 1, wherein when the suspension mount is connected to the first ceiling structure, a first included angle is formed between the first member and the second member, and when the suspension mount is connected to the second ceiling structure, a second included angle is formed between the first member and the second member, and the first included angle differs from the second included angle.

4. The suspension mount as claimed in claim 1, further comprising a fastener, wherein the first member comprises a first fastening hole, the second member comprises a second fastening hole, the first fastening hole and the second fastening hole are located on the same side of the suspension mount relative to the pivot shaft, and when the suspension mount is connected to the first ceiling structure, the fastener passes through the first fastening hole and the second fastening hole to restrict the position of first member relative to the second member, and the fastener is a restriction belt or a positioning post.

5. The suspension mount as claimed in claim 1, wherein an elastic recovery force is applied between the first member and the second member thereby making the first restriction unit and the third restriction unit to be close together, and making the second restriction unit and the fourth restriction unit to be close together.

6. The suspension mount as claimed in claim 5, wherein the elastic recovery force is generated from a torsion spring, the torsion spring is wrapped around the pivot shaft, an end of the torsion spring abuts the first member, and the other end of the torsion spring abuts the second member.

7. The suspension mount as claimed in claim 5, wherein the elastic recovery force is generated from a straight spring, the first member comprises a first attachment portion, the second member comprises a second attachment portion, the first attachment portion is disposed on a first end of the first member, the second attachment portion is disposed on a second end of the second member, the first attachment portion and the second attachment portion are located on the same side of the suspension mount relative to the pivot shaft, one end of the straight spring is connected to the first attachment portion, and the other end of the straight spring is connected to the second attachment portion.

8. The suspension mount as claimed in claim 1, further comprising a ratchet wheel and an elastic pawl adapted to engage the ratchet wheel, the ratchet wheel disposed on the pivot shaft and being moved together with the second member, the elastic pawl disposed on the first member, wherein when the suspension mount engages the first ceiling structure, the elastic pawl prevents the ratchet wheel to rotate in a loosening direction, thereby preventing the first ceiling structure to be released from the suspension mount.

9. The suspension mount as claimed in claim 1, wherein the first restriction unit comprises a first holding portion, the second restriction unit comprises a second holding portion, the third restriction unit comprises a first abutting portion, the fourth restriction unit comprises a second abutting portion, and when the suspension mount engages the first ceiling structure, the first holding portion pushes against a flange of the first ceiling structure to move toward the first abutting portion so that the other flange of the first ceiling structure abuts against the first abutting portion, and the second holding portion pushes against the other flange of the first ceiling structure to move toward the second abutting portion so that the flange of the first ceiling structure abuts against the second abutting portion.

10. The suspension mount as claimed in claim 9, wherein the first restriction unit comprises a first hook portion, the second restriction unit comprises a second hook portion, the third restriction unit comprises a third hook portion, the fourth restriction unit comprises a fourth hook portion, and when the suspension mount engages the third ceiling structure, the first hook portion and the fourth hook portion hook a flange of the third ceiling structure, and the second hook portion and the third hook portion hook the other flange of the third ceiling structure.

11. The suspension mount as claimed in claim 10, wherein the extending distance of the first holding portion from and perpendicular to the first member differs from the extending distance of the first hook portion from and perpendicular to the first member, and the extending distance of the first abutting portion from and perpendicular to the second member differs from the extending distance of the third hook portion from and perpendicular to the second member.

12. The suspension mount as claimed in claim 11, wherein when the suspension mount is connected to the third ceiling structure, the third ceiling structure is located above the first holding portion and the second holding portion.

13. The suspension mount as claimed in claim 10, wherein the suspension mount is capable of selectively hanging the electronic device onto a fourth ceiling structure, when the suspension mount is connected to the fourth ceiling structure, the first hook portion hooks a flange of the fourth ceiling structure, the second abutting portion abuts the flange of the fourth ceiling structure, the second hook portion hooks the other flange of the fourth ceiling structure, and the first abutting portion abuts the other flange of the fourth ceiling structure.

14. The suspension mount as claimed in claim 1, wherein the first restriction unit comprises a first protrusion, the second restriction unit comprises a second protrusion, the first protrusion and the second protrusion are adapted to abut a bottom of the first ceiling structure.

15. A suspension mount, capable of selectively hanging an electronic device onto at least first ceiling structure, second ceiling structure or third ceiling structure, each of the first ceiling structure, the second ceiling structure and the third ceiling structure being longitudinal and having a central rib, the width of the first ceiling structure being different from the width of the second ceiling structure, the first ceiling structure and the second ceiling structure being lower than the ceiling tiles thereby being capable of having the ceiling tiles to be placed thereon, the third ceiling structure received in a recess between the ceiling tiles, and the suspension mount comprising:
 a first member, comprising a first restriction unit and a second restriction unit;
 a pivot shaft; and
 a second member, wherein the second member pivots relative to the first member about the pivot shaft, the second member comprises a third restriction unit and a fourth restriction unit, the first restriction unit and the second restriction unit protrude from the first member in a direction parallel to the pivot shaft, the third restriction unit and the fourth restriction unit protrude in the direction, the first restriction unit corresponds to the third restriction unit, the second restriction unit corresponds to the fourth restriction unit, wherein when the suspension mount is connected to the first ceiling structure, the first restriction unit and the fourth restriction unit abut one side of the first ceiling structure, and the second restriction unit and the third restriction unit abut the other side of the first ceiling structure, wherein the first member and the second member compose an X-shaped structure.

16. The suspension mount as claimed in claim 15, wherein an elastic recovery force is applied between the first member and the second member thereby making the first restriction unit and the third restriction unit to be close together, and making the second restriction unit and the fourth restriction unit to be close together.

17. The suspension mount as claimed in claim 15, wherein the first restriction unit comprises a first holding portion, the second restriction unit comprises a second holding portion, the third restriction unit comprises a first abutting portion, the fourth restriction unit comprises a second abutting portion, and when the suspension mount engages the first ceiling structure, the first holding portion pushes against a flange of the first ceiling structure to move toward the first abutting portion so that the other flange of the first ceiling structure abuts against the first abutting portion, and the second holding portion pushes against the other flange of the first ceiling structure to move toward the second abutting portion so that the flange of the first ceiling structure abuts against the second abutting portion.

18. The suspension mount as claimed in claim 17, wherein the first restriction unit comprises a first hook portion, the second restriction unit comprises a second hook portion, the third restriction unit comprises a third hook portion, the fourth restriction unit comprises a fourth hook portion, and when the suspension mount engages the third ceiling structure, the first hook portion and the fourth hook portion hook a flange of the third ceiling structure, and the second hook portion and the third hook portion hook the other flange of the third ceiling structure.

19. A suspension mount, capable of selectively hanging an electronic device onto at least first ceiling structure, second ceiling structure or third ceiling structure, each of the first ceiling structure, the second ceiling structure and the third ceiling structure being longitudinal and has a central rib, the width of the first ceiling structure being different from the width of the second ceiling structure, the first ceiling structure and the second ceiling structure being lower than the ceiling tiles thereby being capable of having the ceiling tiles to be placed thereon, the third ceiling structure received in a recess between the ceiling tiles, and the suspension mount comprising:
 a first member, having a first restriction unit and a second restriction unit extended therefrom and toward a direction;
 a pivot shaft; and
 a second member, relative to the first member about the pivot shaft, and having a third restriction unit and a fourth restriction unit extended therefrom and toward the direction, the first restriction unit corresponds to the third restriction unit, the second restriction unit corresponds to the fourth restriction unit, the first restriction unit is rotationally symmetrical to the second restriction unit, and the third restriction unit is rotationally symmetrical to the fourth restriction unit, the first restriction unit comprises a first holding portion and a first hook portion extending in the direction, and the extended distances from the of the first holding portion and the first hook portion are different.

20. The suspension mount as claimed in claim 19, wherein the direction is either parallel to the pivot shaft, or perpendicular to the first member and the second member.

\* \* \* \* \*